(12) United States Patent
Kim et al.

(10) Patent No.: US 8,671,441 B2
(45) Date of Patent: Mar. 11, 2014

(54) METHOD AND APPARATUS FOR REGISTERING A DEVICE IN ACCESS POINT

(75) Inventors: Il-Joo Kim, Seoul (KR); Jong-Wook Park, Seoul (KR); Ho Jin, Yongin-si (KR); Young-Chul Sohn, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 145 days.

(21) Appl. No.: 13/055,360

(22) PCT Filed: May 25, 2009

(86) PCT No.: PCT/KR2009/002711
§ 371 (c)(1),
(2), (4) Date: Jan. 21, 2011

(87) PCT Pub. No.: WO2010/011023
PCT Pub. Date: Jan. 28, 2010

(65) Prior Publication Data
US 2011/0126271 A1    May 26, 2011

(30) Foreign Application Priority Data

Jul. 23, 2008  (KR) .................. 10-2008-0071899

(51) Int. Cl.
*H04L 29/06*  (2006.01)
(52) U.S. Cl.
USPC ............................................. 726/4
(58) Field of Classification Search
USPC ............................................. 726/4
See application file for complete search history.

(56) References Cited

U.S. PATENT DOCUMENTS

| 7,127,234 | B2 | 10/2006 | Ishii |
| 2005/0201557 | A1* | 9/2005 | Ishidoshiro ............. 380/44 |
| 2005/0266826 | A1* | 12/2005 | Vlad ..................... 455/410 |
| 2007/0184837 | A1 | 8/2007 | Hohl et al. |

FOREIGN PATENT DOCUMENTS

| CN | 1614920 A | 5/2005 |
| CN | 1682487 A | 10/2005 |
| CN | 1918876 A | 2/2007 |
| KR | 10-2007-0116151 A | 12/2007 |
| WO | 2007024357 A2 | 3/2007 |

OTHER PUBLICATIONS

International Search Report for PCT/KR2009/002711 issued Dec. 22, 2009 [PCT/ISA/210].

(Continued)

*Primary Examiner* — Jason Gee
(74) *Attorney, Agent, or Firm* — Sughrue Mion, PLLC

(57) ABSTRACT

Provided is a method of registering an unregistered device in an access point (AP) by using a registered device registered in the AP, the method including: transmitting a control signal for controlling the registered device to the registered device so as to transmit a mode change request, which requests the AP to change a mode to an authentication approval mode approving an authentication operation with the unregistered device, to the AP; transmitting a mode confirm request, which confirms whether an operation mode of the AP is the authentication approval mode, to the AP; receiving a mode confirm response as a response to the mode confirm request from the AP that receives the mode change request; and selectively performing an authentication operation with the AP, based on the received mode confirm response.

22 Claims, 4 Drawing Sheets

(56) References Cited

OTHER PUBLICATIONS

Written Opinion for PCT/KR2009/002711 issued Dec. 22, 2009 [PCT/ISA/237].
Communication dated Jul. 31, 2012 issued by the European Patent Office in counterpart European Application No. 09800504.4.
Communication dated Feb. 26, 2013, issued by the State Intellectual Property Office of the People's Republic of China in counterpart Chinese Application No. 200980129016.X.
Communication dated Aug. 16, 2013 from the State Intellectual Property Office of P.R. China in a counterpart application No. 200980129016.

* cited by examiner

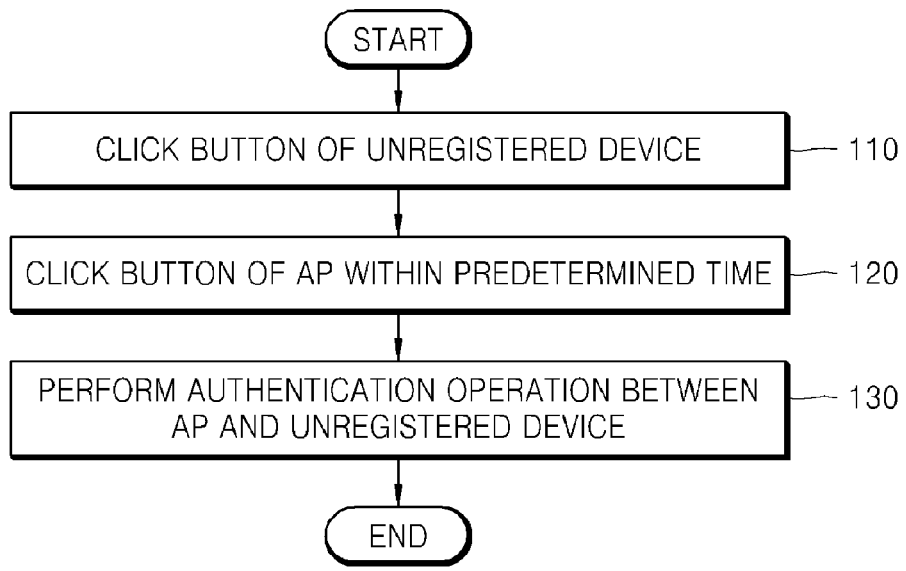
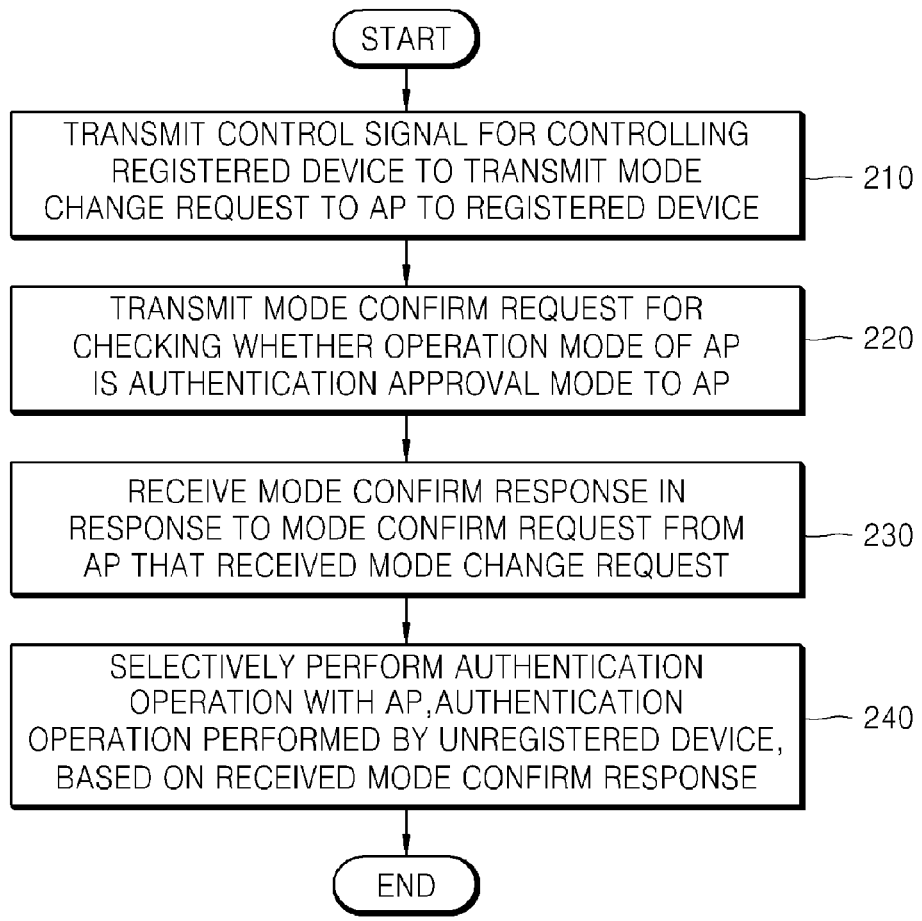

METHOD AND APPARATUS FOR REGISTERING A DEVICE IN ACCESS POINT

TECHNICAL FIELD

Methods and apparatuses consistent with the present invention relate to registering a device in an access point (AP)

BACKGROUND ART

As a number of devices using a wireless network increased, a method of simplifying an authentication process required to register a device in an access point (AP) has become an issue. Accordingly, a Wifi Protective Setup Specification (WPS spec.) was defined.

FIG. 1 is a flowchart illustrating a conventional method of authenticating a device.

[Various methods may be used to register a device in an AP in a wireless network, but the conventional method of FIG. 1 uses a push button configuration (PBC) according to WPS spec.

In operation 110, a button of an unregistered device to be registered in an AP is clicked.

In operation 120, a button of the AP is clicked within a predetermined time.

For example, the button of the AP may be clicked after 120 seconds from clicking the button of the unregistered device.

In operation 130, the AP performs an authentication operation on the unregistered device.

According to WPS spec., by performing operations 110 through 130, the unregistered device is registered in the AP.

Meanwhile, the unregistered device may be registered in the AP by using a third device registered in the AP. In this case, the third device requires a register for performing an authentication operation. When the register is included in the third device, the unregistered device is registered in the AP by the third device, the AP, and the unregistered device exchanging messages related to registration of the unregistered device.

DISCLOSURE OF INVENTION

Technical Solution

The exemplary embodiments of the present invention provide a method and apparatus for registering a device in an access point (AP)

Advantageous Effects

According to an aspect of the present invention, a user easily registers the unregistered device without directly communicating with the AP that is far away

DESCRIPTION OF DRAWINGS

The above and other features and aspects of the present invention will become more apparent by describing in detail exemplary embodiments thereof with reference to the attached drawings in which:

FIG. 1 is a flowchart illustrating a conventional method of authenticating a device;

FIG. 2 is a flowchart illustrating a method of registering a device in an access point (AP), according to an embodiment of the present invention;

BEST MODE

Figure 3:
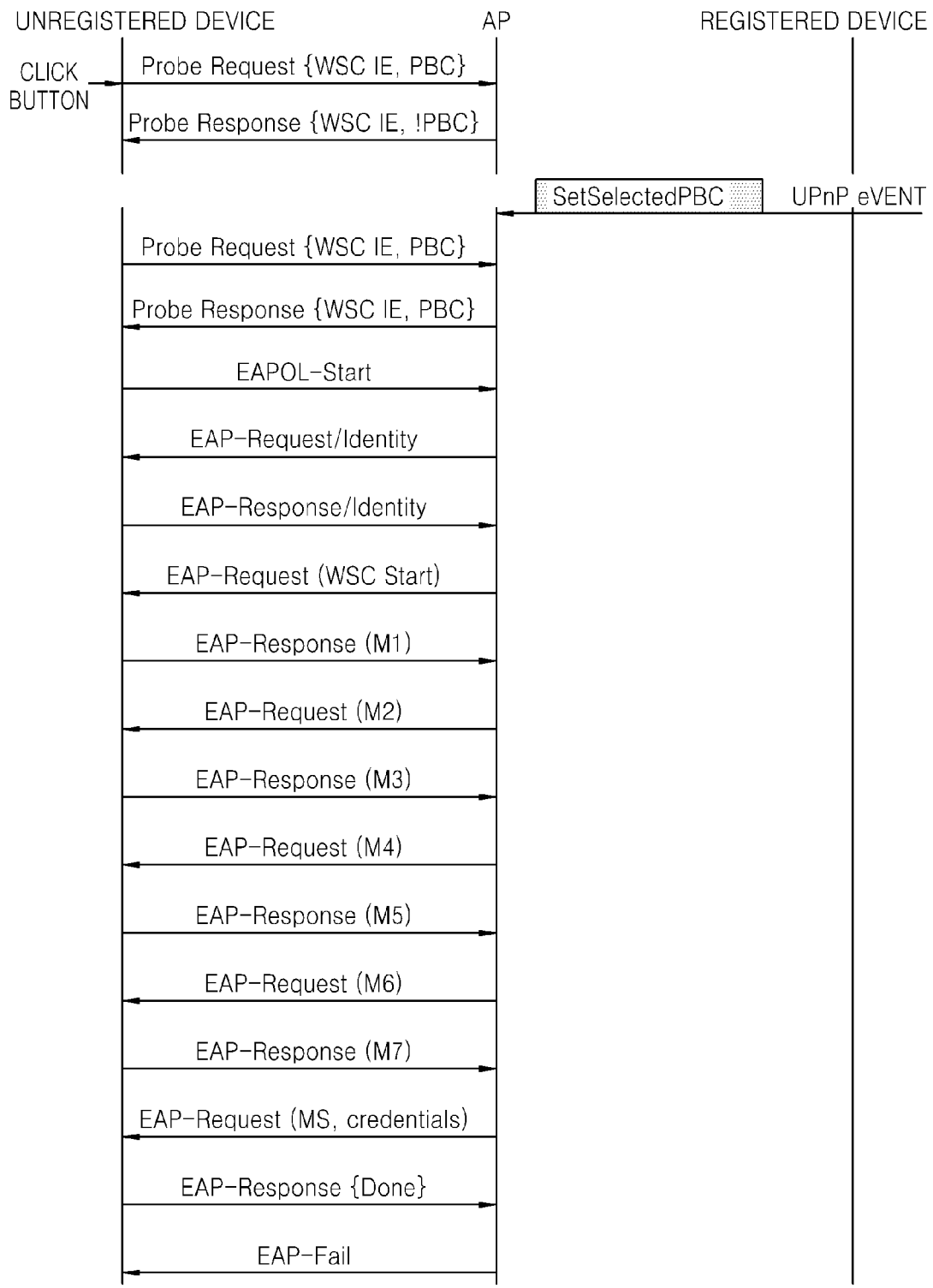
FIG. 3 is a diagram for describing a method of performing authentication, according to an embodiment of the present invention.

According to an aspect of the present invention, there is provided a method of registering an unregistered device in an AP by using a registered device registered in the AP, the method including: transmitting a control signal for controlling the registered device to the registered device so as to transmit a mode change request, which requests the AP to change a mode to an authentication approval mode approving an authentication operation with the unregistered device, to the AP; transmitting a mode confirm request, for checking whether an operation mode of the AP is the authentication approval mode, to the AP; receiving a mode confirm response as a response to the mode confirm request from the AP that receives the mode change request; and selectively performing an authentication operation with the AP, based on the received mode confirm response.

The AP, the registered device, and the unregistered device may be connected via a universal plug and play (UPnP) network, and the mode change request may be formed of a UPnP action for requesting the operation mode of the AP to change to the authentication approval mode.

The selectively performing of an authentication operation may perform the authentication operation by exchanging messages required to register the unregistered device in the AP between the unregistered device and the AP.

The unregistered device may include a predetermined button, and when the predetermined button is clicked, the mode confirm request may be transmitted to the registered device.

The unregistered device may include a predetermined button, and when the predetermined button is clicked, the control signal and the mode confirm request may be respectively transmitted to the registered device and the AP in said order or in reverse order.

The transmitting of the control signal may transmit the control signal to the registered device by using an external input device based on an input of a user.

The selectively performing of the authentication operation may be performed only when the mode confirm response is received within a predetermined time from transmitting of the mode confirm request.

In the selectively performing of the authentication operation, the authentication operation may be performed only when the mode confirm response displays the operation mode of the AP as the authentication approval mode.

The registered device may be a device authenticated by the AP, by inputting a predetermined code to a predetermined device or, when buttons are included in the predetermined device and the AP, by sequentially clicking the buttons.

According to another aspect of the present invention, there is provided an apparatus for registering an unregistered device in an AP by using a registered device registered in the AP, the apparatus including: a transmitter which transmits a control signal for controlling the registered device to the registered device so as to transmit a mode change request, which requests the AP to change a mode to an authentication approval mode approving an authentication operation with the unregistered device, to the AP, and transmits a mode confirm request, for checking whether an operation mode of the AP is the authentication approval mode, to the AP; a receiver which receives a mode confirm response as a response to the mode confirm request from the AP that receives the mode change request; and an authentication performer which selectively performs an authentication operation with the AP, based on the received mode confirm response.

The apparatus may further include an external input device which transmits the control signal to the registered device based on an input of a user, wherein the control signal is selectively transmitted by one of the transmitter and the external input device.

According to another aspect of the present invention, there is provided a computer readable recording medium having recorded thereon a program for executing the method above.

Mode for Invention

Hereinafter, the present invention will be described more fully with reference to the accompanying drawings, in which exemplary embodiments of the invention are shown.

FIG. 2 is a flowchart illustrating a method of registering a device in an access point (AP), according to an embodiment of the present invention.

In operation 210, a control signal for controlling a registered device is transmitted to the registered device, so as to transmit a mode change request, which changes a mode of the AP to an authentication approval mode for approving an authentication operation with an unregistered device, to the AP.

Here, the authentication approval mode is a standby state for authenticating the unregistered device. When the AP is not in the authentication approval mode, the authentication operation with the unregistered device cannot be performed.

Also, the registered device is a device that is registered in the AP by pre-performing the authentication operation with the AP. However, according to an embodiment, when no device is registered in the AP, a third device may be registered in the AP, and the unregistered device may be registered in the AP by using the third device.

Here, the third device may be registered in the AP by inputting a predetermined code to the third device or, when the third device and the AP include buttons, by using a push button configuration (PBC) method, wherein the buttons of the third device and the AP are sequentially clicked, i.e., pushed. However, a method of registering the third device in the AP is not limited thereto, and any conventional method for registering a third device in an AP may be used.

Meanwhile, the AP, the registered device, and the unregistered device may be connected via a universal plug and play (UPnP) network, and in this case, the mode change request may be formed of a UPnP action for requesting the AP to change to the authentication approval mode.

For example, when the AP and the unregistered device perform the authentication operation with the PBC method by using the registered device, the unregistered device transmits a control signal to the registered device, and then the registered device transmits a 'SetSelectedPBC' action to the AP.

Here, the 'SetSelectedPBC' action is a UPnP action for requesting the AP to change the operation mode to a PBC mode, which is an authentication approval mode for approving the authentication operation with the unregistered device. When the AP receives the 'SetSelectedPBC' action, the AP changes its operation mode to the PBC mode.

However, the mode change request is not limited to such a UPnP action, and may include all types of commands or messages for requesting the operation mode of AP to the authentication approval mode for approving the authentication operation with the unregistered device. The mode change request may be transmitted via a safe communication channel.

The control signal may be transmitted to the registered device by the unregistered device, or may be transmitted to the registered device by using an external input device. Details thereof will be described later with reference to FIGS. 4 and 5. Here, the control signal may be transmitted via a radio frequency communication or infrared communication method, but is not limited thereto.

In operation 220, a mode confirm request for checking whether the operation mode of the AP is the authentication approval mode is transmitted to the AP.

An order of performing operation 210 and operation 220 may change. In other words, the control signal may be transmitted to the registered device after the unregistered device transmits the mode confirm request to the AP.

In operation 230, a mode confirm response is received from the AP that received the mode change request, in response to the mode confirm request.

The mode confirm response is information showing whether the operation mode of the AP is the authentication approval mode. The mode confirm response may show that the operation mode of the AP is the authentication approval mode or show that the operation mode of the AP is not the authentication approval mode.

In operation 240, the unregistered device selectively performs the authentication operation with the AP, based on the received mode confirm response.

The authentication operation is performed only when the mode confirm response shows that the operation mode of the AP is the authentication approval mode.

According to an exemplary embodiment, the authentication operation may be performed only when the mode confirm response is received within a predetermined time from the mode confirm request is transmitted.

For example, the authentication operation between the AP and the unregistered device may be performed only when the mode confirm response is received from the AP within 120 seconds after the unregistered device transmitted the mode confirm request to the AP.

Here, the authentication operation may be performed by exchanging messages required for registering the unregistered device in the AP between the unregistered device and the AP.

FIG. 3 is a diagram for describing a method of performing authentication, according to an embodiment of the present invention.

Referring to FIG. 3, when a button of an unregistered device is clicked, Probe Request {WSC IE, PBC} as a mode confirm request for checking whether an operation mode of an AP is a PBC mode as an authentication approval mode, is transmitted to the AP.

Then, the unregistered device receives Probe Response {WSC IE, !PBC} as a mode confirm response showing that the operation mode of the AP is not the PBC mode as the authentication approval mode from the AP. In this case, an authentication operation between the unregistered device and the AP is not performed.

Next, the AP receives a 'SetSelectedPBC' action as a mode change request from a registered device. The 'SetSelectedPBC' action is a UPnP action for requesting the operation mode of the AP to change to the PBC mode.

When the unregistered device transmits Probe Request {WSC IE, PBC} again to the AP that received the 'SetSelectedPBC' action, the AP transmits Probe Response {WSC IE, PBC} showing that its operation mode is the PBC mode to the unregistered device, since the operation mode of the AP has changed to the PBC mode upon receiving Probe Request {WSC IE, PBC}.

Upon receiving Probe Response {WSC IE, PBC}, the unregistered device notifies the AP to start the authentication operation. Accordingly, the authentication operation is performed by exchanging messages required to register the unregistered device in the AP, between the unregistered device and the AP.

The messages exchanged between the unregistered device and the AP illustrated in FIG. 3 are described in detail in Wifi Protected Setup Specification (WPS spec.), and thus details thereof are omitted herein.

As described above, according to the current embodiment of the present invention, the registered device does not participate in the authentication operation between the unregistered device and the AP after transmitting the 'SetSelectedPBC' action to the AP, and thus a register for performing an authentication operation is not required to be included in the registered device. In other words, the unregistered device is registered in the AP by using the registered device that does not include a register.

Also, when the unregistered device is registered in the AP by using the registered device, the unregistered device is registered in the AP even when the unregistered device is far away from the AP, as a user registers the unregistered device in the AP by using the registered device that is close to the unregistered device. Accordingly, the user easily registers the unregistered device without directly communicating with the AP that is far away.

Figure 4:
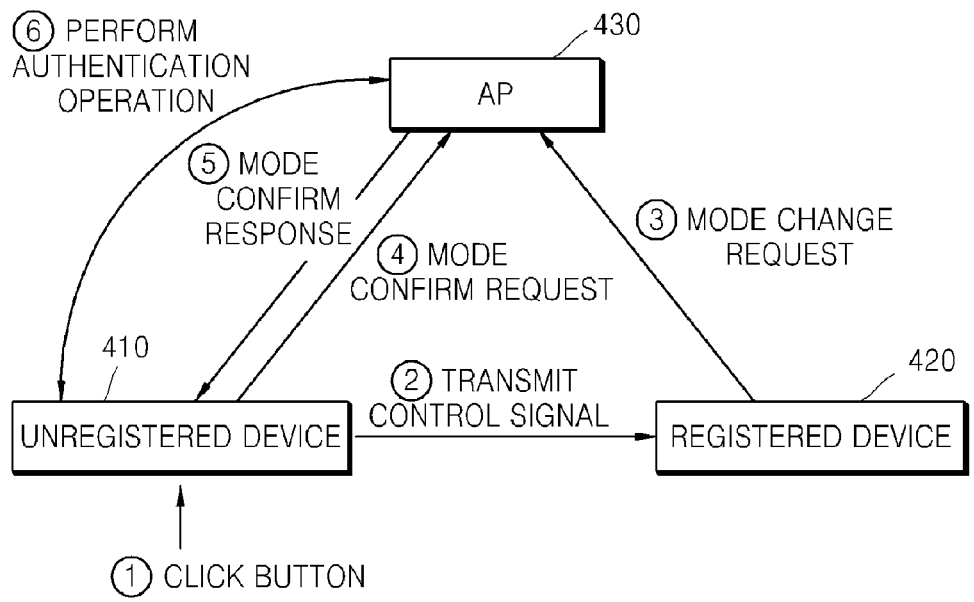
FIG. 4 is a diagram for describing a method of registering a device in an AP, according to an embodiment of the present invention.

FIG. 4 is a diagram for describing a method of registering a device in an AP, according to an embodiment of the present invention.

Referring to FIG. 4, a user clicks a button of an unregistered device 410 in operation 1.

In operation 2, the unregistered device 410 transmits a control signal to a registered device 420. Here, the control signal controls the registered device 420 to transmit a mode change request to an AP 430.

In operation 3, according to the control signal received from the unregistered device 410, the registered device 420 transmits the mode change request to the AP 430.

Here, the mode change request requests the AP 430 to change its operation mode to an authentication approval mode for approving an authentication operation with the unregistered device 410.

In operation 4, the unregistered device 410 transmits a mode confirm request to the AP 430. Here, the unregistered device 410 transmits the mode confirm request to the AP 430 in response to the user clicking the button of the unregistered device 410. However as described above, according to an embodiment, the control signal may be transmitted after the unregistered device transmits the mode confirm request.

In operation 5, the AP 430 transmits a mode confirm response, which shows that the operation mode of the AP 430 is the authentication approval mode, to the unregistered device 410.

In operation 6, the authentication operation between the unregistered device 410 and the AP 430 is performed based on the received mode confirm response.

As described above, when the unregistered device 410 does not receives the mode confirm response from the AP 430 within a predetermined time from transmitting the mode confirm request to the AP 430, or when the unregistered device 410 receives the mode confirm response showing that the operation mode of the AP 430 is not the authentication approval mode from the AP 430, the unregistered device 410 does not perform the authentication operation with the AP 430.

According to an embodiment, even when the mode confirm response showing that the operation mode of the AP 430 is not the authentication approval mode is received, the unregistered device 410 may re-transmit the mode confirm request to the AP 430 after a predetermined time. In this case, when the mode confirm response showing that the operation mode of the AP 430 is the authentication approval mode is received in response to the re-transmitted mode confirm request, the authentication operation between the unregistered device 410 and the AP 430 is performed.

Also according to an embodiment, the control signal, the mode confirm request, and the mode confirm response may be transmitted and received via a security safe communication channel.

Figure 5:
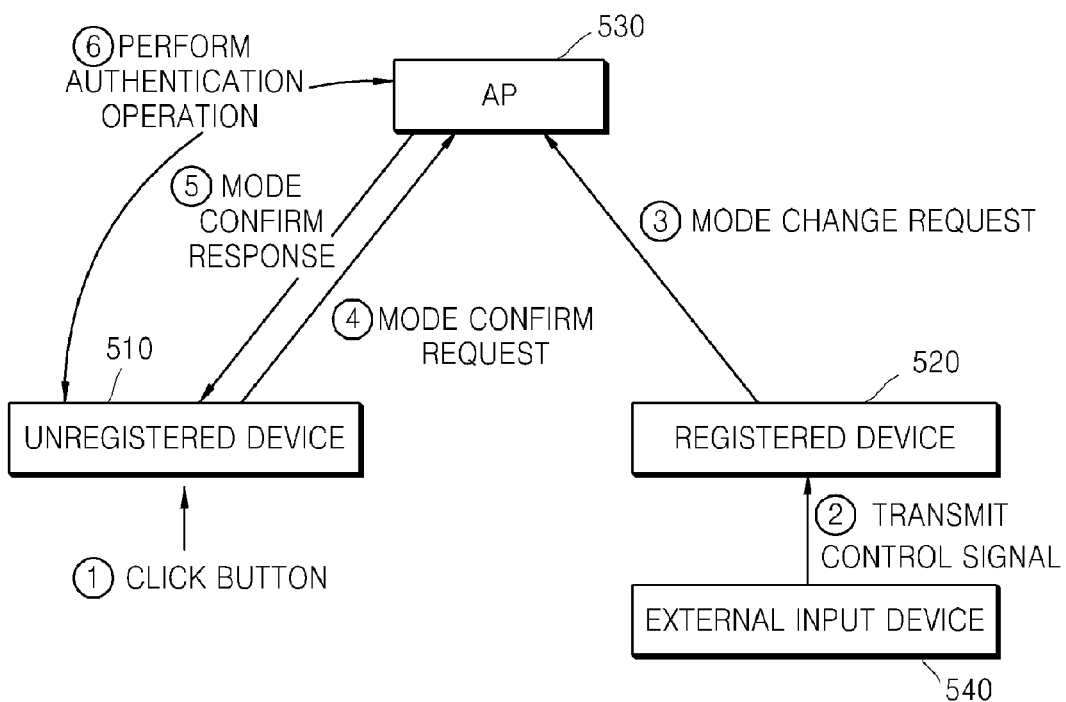
FIG. 5 is a diagram for describing a method of registering a device in an AP, according to another embodiment of the present invention.

FIG. 5 is a diagram for describing a method of registering a device in an AP, according to another embodiment of the present invention.

Referring to FIG. 5, a button of an unregistered device 510 is clicked in operation 1.

Then in operation 2, a user may transmit a control signal to a registered device 520 by using an external input device 540.

Here, the external input device 540 may be a remote controller unrelated to the unregistered device 510 and the registered device 520, but when the registered device 520 is a computer, TV, or the like, the external input device 540 may be a keyboard, a mouse, or a remote controller.

A difference between the embodiment of FIG. 4 and the embodiment of FIG. 5 is that in the embodiment of FIG. 4, the unregistered device 410 transmits the control signal and the mode confirm request when the user clicks the button of the unregistered device 410, but in the embodiment of FIG. 5, the unregistered device 510 transmits only the mode confirm request to the AP 530 when the user clicks the button of the unregistered device 510.

Other operations in the embodiments of FIGS. 4 and 5 are the same except this difference, and thus details about operations 3 through 6 will be omitted herein.

Figure 6:
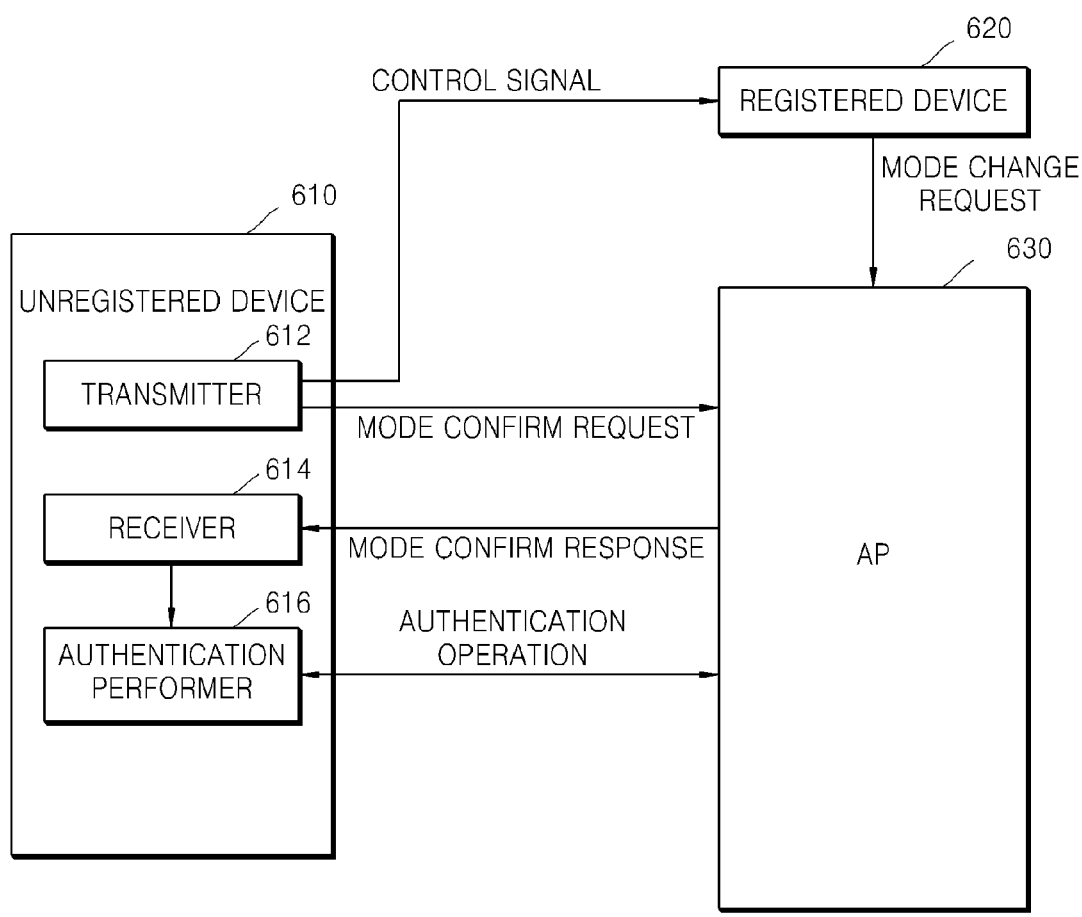
FIG. 6 is a block diagram illustrating an apparatus for registering a device in an AP, according to an embodiment of the present invention.

FIG. 6 is a block diagram illustrating an apparatus 610 for registering a device in an AP, according to an embodiment of the present invention.

Referring to FIG. 6, the apparatus 610 loaded in an unregistered device includes a transmitter 612, a receiver 614, and an authentication performer 616. Also, for convenience of description, a registered device 620 and an AP 630 are further illustrated.

The transmitter 612 transmits a control signal for controlling the registered device 620 to transmit a mode change request for the AP 630, to the registered device 620.

Also, the transmitter 612 transmits a mode confirm request for checking whether an operation mode of the AP 630 is an authentication approval mode to the AP 630.

The receiver 614 receives a mode confirm response from the AP 630 that received the mode change request, in response to the mode confirm request.

The authentication performer 616 selectively performs an authentication operation with the AP 630, based in the mode confirm response received from the AP 630.

Also according to an embodiment, the apparatus 610 may further include an external input device (not shown) for transmitting the control signal to the registered device 620. However, when the external input device is included in the apparatus 610, the control signal is selectively transmitted by the transmitter 612 or the external input device.

The embodiments of the present invention can be written as computer programs and can be implemented in general-use digital computers that execute the programs using a computer readable recording medium. Examples of the computer readable recording medium include magnetic storage media (e.g., ROM, floppy disks, hard disks, etc.), optical recording media (e.g., CD-ROMs, or DVDs). In other exemplary embodiments, the computer readable recording medium may include storage media such as carrier waves (e.g., transmission through the Internet).

While this invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. A method of registering an unregistered device in an access point (AP) by using a registered device registered in the AP, the method comprising:
  transmitting to the registered device, a control signal for controlling the registered device to transmit a mode change request to the AP, which requests the AP to change a mode to an authentication approval mode for approving an authentication operation with the unregistered device;
  transmitting to the AP directly from the unregistered device, a mode confirm request for checking whether the mode of the AP is the authentication approval mode;
  receiving from the AP that receives the mode change request, a mode confirm response as a response to the mode confirm request; and
  selectively performing the authentication operation with the AP, based on the received mode confirm response.

2. The method of claim 1, wherein the AP, the registered device, and the unregistered device are connected via a universal plug and play (UPnP) network, and the mode change request includes a UPnP action for requesting the operation mode of the AP to change to the authentication approval mode.

3. The method of claim 1, wherein the selectively performing of the authentication operation performs the authentication operation by exchanging messages to register the unregistered device in the AP, between the unregistered device and the AP.

4. The method of claim 1, wherein the unregistered device includes a predetermined button, and if the predetermined button is pushed, the mode confirm request is transmitted to the registered device.

5. The method of claim 1, wherein the unregistered device includes a predetermined button, and if the predetermined button is pushed, the control signal and the mode confirm request are respectively transmitted to the registered device and the AP from the unregistered device in said order or in a reverse order.

6. The method of claim 1, wherein the transmitting to the registered device, the control signal transmits the control signal to the registered device by using an external input device based on an input of a user.

7. The method of claim 1, wherein the selectively performing of the authentication operation is performed only when the mode confirm response is received within a predetermined time from the transmitting of the mode confirm request.

8. The method of claim 1, wherein in the selectively performing of the authentication operation, the authentication operation is performed only if the mode confirm response indicates the operation mode of the AP as the authentication approval mode.

9. The method of claim 1, wherein the registered device is a device authenticated by the AP, by inputting a predetermined code to a predetermined device or, if buttons are included in the predetermined device and the AP, by sequentially pushing the buttons.

10. The method of claim 1, wherein the registered device does not include a register for performing an authentication operation.

11. The method of claim 1, wherein the registered device generates a SetSelectedPBC command in response to receiving the control signal from the unregistered device and transmits the generated SetSelectedPBC command to the access point, and wherein the access point changes the operation mode to a PBC mode and communicates directly with the unregistered device to perform the authentication operation.

12. The method of claim 1, wherein the registered device does not transmit signals to the unregistered device during registration process which is from a time point of said transmitting of the control signal to the registered device to registering the unregistered device.

13. An apparatus for registering an unregistered device in an AP by using a registered device registered in the AP, the apparatus comprising:
  a transmitter which transmits a control signal to the registered device, said control signal instructs the registered device to transmit a mode change request to the AP, which requests the AP to change a mode to an authentication approval mode for approving an authentication operation with the unregistered device, and transmits directly to the AP a mode confirm request, for checking whether the mode of the AP is the authentication approval mode;
  a receiver which receives from the AP that receives the mode change request, a mode confirm response as a response to the mode confirm request; and
  an authentication unit which selectively performs the authentication operation with the AP, based on the received mode confirm response.

14. The apparatus of claim 13, wherein the AP, the registered device, and the unregistered device are connected via a UPnP network, and the mode change request comprises a UPnP action for requesting the operation mode of the AP to change to the authentication approval mode.

15. The apparatus of claim 13, wherein the authentication unit performs the authentication operation by exchanging messages to register the unregistered device in the AP, between the unregistered device and the AP.

16. The apparatus of claim 13, wherein the unregistered device comprises a predetermined button, and if the button is pushed, the mode confirm request is transmitted to the registered device.

17. The apparatus of claim 13, wherein the unregistered device comprises a predetermined button, and if the button is pushed, the control signal and the mode confirm request are respectively transmitted to the registered device and the AP in said order or in a reverse order.

18. The apparatus of claim 13, further comprising an external input device which transmits the control signal to the registered device based on an input of a user, wherein the control signal is selectively transmitted by one of the transmitter and the external input device.

19. The apparatus of claim 13, wherein the authentication unit performs the authentication operation only when the receiver receives the mode confirm response within a predetermined time from the transmitter transmitting the mode confirm request.

20. The apparatus of claim 13, wherein the authentication unit performs the authentication operation only if the mode confirm response indicates the operation mode of the AP in the authentication approval mode.

21. The apparatus of claim 13, wherein the registered device is a device authenticated by the AP, by inputting a predetermined code to a predetermined device or, if buttons are included in the predetermined device and the AP, by sequentially pushing the buttons.

22. A non-transitory computer readable recording medium having recorded thereon a program for executing a method, the method comprising:
- transmitting from the unregistered device to the registered device, a control signal, which instructs the registered device to transmit a mode change request to the AP, which requests the AP to change a mode to an authentication approval mode for approving an authentication operation with the unregistered device;
- transmitting from the unregistered device directly to the AP, a mode confirm request for checking whether the mode of the AP is the authentication approval mode;
- receiving from the AP that receives the mode change request, a mode confirm response as a response to the mode confirm request; and
- selectively performing the authentication operation with the AP, based on the received mode confirm response.

* * * * *